3,108,971
BITUMINOUS EMULSIONS CONTAINING
ADHESION AGENTS
Edward W. Mertens, El Cerrito, Calif., assignor to California Research Corporation, San Francisco, Calif., a corporation of Delaware
No Drawing. Filed Apr. 4, 1960, Ser. No. 19,520
1 Claim. (Cl. 252—311.5)

The present invention relates to improvements in the manufacture of oil-in-water type anionic bituminous emulsions. More particularly, it relates to improvements in the manufacture of anionic asphalt-in-water emulsions, which result in a greater degree of adhesion displayed by the bituminous binder in the emulsion when applied to stone aggregate.

The term "bituminous binder" as employed in the description which follows, refers to any bitumen emulsifiable in water with the aid of suitable anionic emulsifiers or emulsifying bases, and, consequently, comprises various asphalts (natural, steam-refined, air-blown, etc.), coal-tar, coal-tar pitch, gilsonite, and the like.

Emulsified bitumens and, in particular, emulsified asphalts are widely used for road-paving work and in other surfacing applications. The emulsions are applied either by distributing them, as for instance by spraying, over a base course of stone aggregate or by mixing them with the stone aggregate in mechanical mixers at the plant or in road-mixing mobile equipment, such as "Moto-Pavers" at the job site, and then spreading and compacting the mixture over the road surface being constructed or repaired.

Evidently, an adequate coating and a strong bond (adhesion) of the bituminous binder to the stone aggregate represents one of the principal and more important properties sought by the applicator in an emulsion.

The property of adhesion, however, is not always easy to obtain and appears to be affected by minor, elusive variations in the composition of the emulsions. Accordingly, the formulators-manufacturers of bituminous emulsions are continuously striving to develop new techniques and to discover additive agents which would insure better adhesion of the binder to the aggregate. This is by no means a simple task, since the prior art of bitumens, and particularly that of asphalts, is highly empirical, and the manufacturer preparing an asphalt emulsion cannot rely on analogies conjectured on the strength of the previously noted behavior of a certain additive material in a common cutback asphalt or in an asphalt cement and cannot expect this material to behave in the same manner in an asphalt emulsified in water.

Various salts of inorganic acids, proposed in the past as additives for improving the adhesion of anionic asphalt emulsions, have often been found to cause a premature breakdown of the emulsions while in storage and occurrence of excessive shot formation, even though stored but a relatively short period of time prior to the actual application of these emulsions to stone aggregate.

In accordance with the present invention, and quite surprisingly, it became possible to impart a greatly improved adhesion to anionic bituminous emulsions by introducing into these emulsions a small but effective amount of a particular alkanolamine.

The alkanolamines found to be so operative are water-soluble $C_2$-$C_3$-alkanolamines essentially lacking in lipophilic characteristics and characterized by the general formula

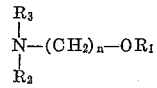

in which $R_1$ may be hydrogen, or a $C_2$-$C_3$-hydroxyalkyl radical, $R_2$ and $R_3$ may be hydrogen, methyl, ethyl, propyl, isopropyl, or yet $C_2$-$C_3$-hydroxyalkyl radicals, and the subscript "$n$" is an integer from 2 to 3. In other words, the operative alkanolamines are mono-, di-, and tri-ethanol-, -propanol-, and -isopropanol-amines, and substituted mono- and diethanol-, -propanol-, and -isopropanol-amines in which the substituents on the nitrogen atom are alkyl groups of 1 to 3 carbon atoms. Those of the aforedescribed alkanolamines whose molecule contains 8 or less carbon atoms, and which accordingly, can be readily and completely dissolved in water, are particularly suitable as adhesion-improving additives in accordance with the present invention. Mono-, di- and tri-ethanol-amines and substituted mono- and di-ethanolamines are preferred, because of their generally lower cost.

When added to the emulsion in amounts which may range from about 0.10 to about 1.5%, and preferably from about 0.25 to about 1.0% of the weight of the finished emulsion, by being dissolved in the compatible aqueous phase which is subsequently used for emulsification of bitumen, these water-soluble alkanolamines unexpectedly increase the adhesion of the bituminous binder to the stone aggregate. The resulting improvement in adhesion is surprisingly significant; in fact, the adhesion is from two to almost five times greater than the adhesion obtainable with the same emulsions but without water-soluble alkanolamines. The aforementioned introduction of water-soluble $C_2$-$C_3$-alkanolamines into oil-in-water type anionic emulsions of asphalts characterized by acid numbers of at least 0.7 and higher, such as various asphalts of Californian and Venezuelan origin, enables, in particular, to enhance the adhesion of these asphalts to stone aggregate without adverse side effects encountered in the use of other reported adhesion-improving additive materials.

The emulsions which may be improved in conformity with the present invention may contain from about 50 to about 75% by weight of bitumen, such as asphalt, and preferably from about 55 to about 75% by weight. Accordingly the corresponding asphalt emulsions are those known in the trade under the name of rapid-setting (RS-1 and RS-2) emulsions, such as are employed for "seal-coat" paving applications, and in "coarse aggregate" mix and "sand slurry" field applications.

The bituminous phase is emulsified in the aqueous phase, which contains in solution operative water-soluble alkanolamines, with the aid of any suitable, available anionic emulsifier or an alkaline base, such as sodium hydroxide, potassium hydroxide, lithium hydroxide, tetra-ethanol ammonium hydroxide, and the like, employed in amounts sufficient to emulsify the bitumen or to form sufficient emulsifying soaps with the carboxylic acids inherently present in, or appropriately added to, the bitumen, usually an asphalt. In most cases, from 0.07 to 1.5% by weight of the most conventional emulsifying alkaline base, namely, sodium hydroxide, will suffice to effect the desired emulsification. With other alkaline bases, the amounts will be raised in proportion to their corresponding molecular weights in conformity with the usual practices of the asphalt emulsion art.

The finished emulsion may also contain small amounts of different additives ordinarily employed in the asphalt emulsion art to assure emulsion stability, while in storage and prior to the actual use, provided, however, that these additives do not adversely affect the beneficial action of the water-soluble $C_2$-$C_3$-alkalolamine on the adhesion property.

The following examples illustrate the operativeness of the invention and the surprising improvement of the adhesion property achieved by it. In these examples the emulsions contained different water-soluble $C_2$-$C_3$-alkanolamines which have been introduced into the aqueous phase subsequently employed to emulsify the bituminous phase, and the adhesion property of the resulting emulsion was determined in accordance with the following test procedure:

A 100 g. sample of dry rhyolite aggregate of Massachusetts origin, passing a 3/8" sieve and retained in a No. 4 sieve, is weighed into a 16-ounce tin box. An 8 g. quantity of the emulsion heated to 120° F. is added to the aggregate with thorough stirring. The box with the resulting mix is then placed for 24 hours into an oven kept at a constant temperature of 200° F. After this oven cure, the sample is thoroughly remixed until each stone is completely coated with bitumen.

Thereupon a 50 g. sample of the oven-cured mix is dropped into a 600 cc. beaker containing 400 cc. of boiling distilled water, and the contents stirred for one minute at 60 r.p.m. while boiling is continued. Then the beaker is removed from the hot plate, and any asphalt film which may be floating on the water surface is removed with the aid of absorbent paper (blotter). Following this, the sample in the water is taken out, avoiding redeposition of bitumen on the stone, and placed on a blotter for air-drying. Once dried, the mixture is examined for uncoated areas of the aggregate, and the average percentage of stone aggregate which remains coated is then estimated visually. Adhesion of asphalt to at least about 65%, and preferably to 75% and more of the total aggregate surface, is considered as satisfying the requirements of the industry.

EXAMPLE I

In this example a series of emulsions were prepared, each of them containing 0.5% by weight of a different alkanolamine, as an adhesion agent in accordance with the invention, added to the water phase prior to emulsification. The emulsions were formulated with 57% by weight of a 200–300 penetration asphalt of Venezuelan origin, having the acid number in the range from 1.5 to about 2.1, 0.12% of sodium hydroxide as the emulsifying base, and distilled water (to 100%).

The adhesion was determined in accordance with the aforedescribed boiling test, using dry rhyolite aggregate of Massachusetts provenance.

The results of two duplicate test series are assembled in the following Table I.

Table I

| Run No. | Alkanolamine Additive | Adhesion in percent | |
|---|---|---|---|
| | | Series I | Series II |
| 1 | | 20 | 20 |
| 2 | Ethylethanolamine | 70 | 75 |
| 3 | Diethylethanolamine | 60 | 65 |
| 4 | Monoethanolamine | 40 | 45 |
| 5 | Diethanolamine | 70 | 70 |
| 6 | Triethanolamine | 70 | 75 |
| 7 | Polyamine T [1] | 85 | 85 |
| 8 | Isopropylethanolamine | 60 | 55 |

[1] "Polyamine T" is the trademark for a commercial polyethanolamine product, revoverable as a bottoms in the conventional ethanolamine manufacture and consisting mainly of triethanolamine (at least 90%, and often 95% by weight and higher).

It suffices to compare the adhesion values obtained with emulsions containing various alkanolamine additives with the values observed for emulsions which did not contain such additives to see that the presence of $C_2$-$C_3$-alkanolamines causes the adhesion to increase from at least two-fold (run 4) to almost five-fold (run 7).

EXAMPLE II

Another series of emulsions have been prepared using 63% by weight of a similar 200–300 penetration asphalt of Venezuelan origin, 0.07% of sodium hydroxide as the emulsifying base, 0.07% of sodium chloride to parry the adverse effect of hydroxyl ions on emulsion properties, and distilled water (to 100%).

The adhesion agent in this instance was commercial trade-marked material "Amine R" which is a polyethanolamine product consisting mainly of triethanolamine (over 90%, generally 95% or higher). It was introduced into the water phase prior to emulsification in amounts which provide 0.25%, 0.5%, 0.75% and 1.0% by weight concentrations in four different samples of the emulsion. Viscosity and demulsibility of the finished emulsion samples were determined by the standard ASTM D–244 test while the adhesion was measured by a method which represented a slight modification of the previously described boiling test. The modified method was carried out as follows:

100 g. of dry rhyolite aggregate of Massachusetts provenance, graded to pass a 1/4" sieve and to be retained on a No. 10 sieve, is heated to 275–325° F. and mixed with 12 g. of the asphalt emulsion. Two 50 g. samples of the resulting mixture are each spread thinly on a metal can lid and oven-cured at 220° F. for 24 hours. Thereafter, each 50 g. sample is dropped into a 600 cc. beaker containing 400 cc. of boiling distilled water, for three minutes, stirring the contents at 60 r.p.m. The beaker is then removed from the hot plate and after boiling has ceased, cold water is run into the beaker through a hose submerged below the surface of the liquid in the beaker. After the film of asphalt which was formed and floating on the water surface in the beaker has flowed over the side, the samples are withdrawn and placed on a blotter for air-drying. When dry, all coated areas are examined, and an estimate is made of the percentage of the area of stone aggregate still coated.

The results of the tests in this series are tabulated below in Table II.

Table II

| Run No. | Amine-R in percent by Wt. | Viscosity at 122° F. in SSF | Demulsibility (0.02 N $CaCl_2$ in percent) | Adhesion in percent |
|---|---|---|---|---|
| 1 | | 300 | 98 | 20 |
| 2 | 0.25 | 382 | 100 | 50 |
| 3 | 0.50 | 142 | 81 | 80 |
| 4 | 0.75 | 110 | 98 | 90 |
| 5 | 1.00 | 323 | 95 | 85 |

It is readily seen from Table II that the introduction of an alkanolamine material in accordance with the invention substantially increases (2 to 5 times) the adhesion property of the asphalt binder of the emulsion to the stone aggregate. At the same time the two other important emulsion characteristics (viscosity and demulsibility) continue to satisfy the industrial requirements such as are set forth in ASTM specification D–977.

In concluding this description of the invention, I wish it to be understood that the invention is not limited to any specific water-soluble $C_2$-$C_3$-alkanolamine, whether employed in the examples or mentioned elsewhere in the above specification, the examples being offered merely as illustrations of operativeness. Therefore, the invention is limited only by the definitions given in the following claim.

I claim:

An oil-in-water type anionic bituminous emulsion consisting essentially of from about 50 to about 75% by weight of asphalt in the dispersed phase, said asphalt being characterized by an acid number of at least 0.7 and being emulsified in water with the aid of an alkaline base, equivalent to from 0.07% to 1.5% by weight of sodium hydroxide and reacting with the carboxylic acids inherently present in the asphalt to form sufficient soap to emulsify said asphalt; as an adhesion improving additive to the emulsion and in an amount by weight thereof equal to about 0.1 to about 1.5% by weight, the water-soluble polyethanolamine bottoms product of triethanolamine manufacture, at least 90% by weight of said product being triethanolamine; and water as the continuous phase to make up the balance of the emulsion to 100% by weight.

References Cited in the file of this patent

UNITED STATES PATENTS

| | | |
|---|---|---|
| 1,988,879 | Steininger | Jan. 22, 1935 |
| 2,351,912 | Borglin | June 20, 1944 |